June 17, 1930.　　　　I. KULIK　　　　1,764,455
AIR EMITTING AND ELECTRIC LIGHT ACTUATING MIRROR
Filed Jan. 24, 1925
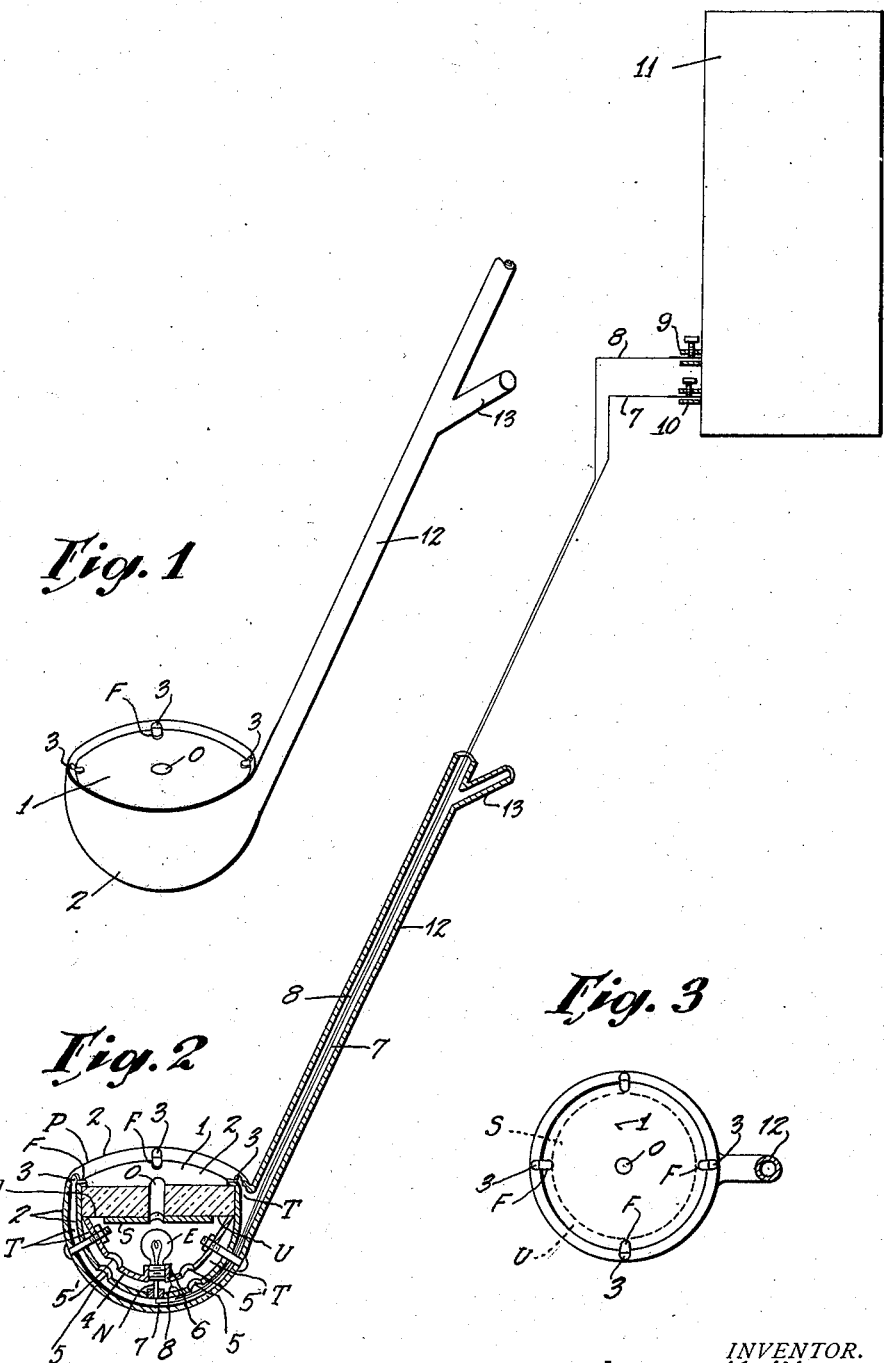
INVENTOR.
Irving Kulik
BY Cornelius Gabriskie
ATTORNEYS.

Patented June 17, 1930

1,764,455

UNITED STATES PATENT OFFICE

IRVING KULIK, OF BROOKLYN, NEW YORK

AIR-EMITTING AND ELECTRIC-LIGHT-ACTUATING MIRROR

Application filed January 24, 1925. Serial No. 4,617.

This invention relates generally to mirrors and is more particularly directed to a novel mirror construction with electric lighting and air cooling feature therefor, said air cooling feature also performing the function of thoroughly cleaning cavities and surfaces of teeth from débris and dust as fast as it accumulates in excavating or grinding operations with the dental engine. This is accomplished by blasts of air conveyed by the device. These blasts of air also can eliminate all heat and thus alleviate the pain attending the friction from the use of burs or stones with the dental engine upon the teeth. By reversing the action and causing the sucking out of air from within the device offensive breaths or disease germ bearing breaths from patient can be prevented from reaching the one examining or operating upon the mouth.

There are several different well known types of electric mirrors on the market notably among which the electric light is directed upon the reflecting surface of the mirror to be reflected thereby upon the areas of operation. The electric light emitting bulb in this type of electric mirrors is positioned upon the handle somewhat distantly spaced above the reflecting surface of the mirror and while the electric light rays are sent to the reflecting surface, there are also light rays sent over the entire mouth.

My long experience in the use of electric mirror of this well known type has shown me the numerous drawbacks incident thereto. In the first place, the handle of the mirror which should be very thin for delicate handling, is very bulky and makes the use of the mirror an awkward matter. Secondly, because of the structures mounted upon the handle, the mirror cannot be used to retract the cheeks and lips as is very often necessary. Thirdly, if any kind of dust or débris falls on the light emitting bulb its reflection from the reflecting surface presents an appearance as if the dust or débris is upon a tooth surface, confusing the operator. Fourth, if any particles of dust or débris fall upon the reflecting surface of the mirror they must be immediately cleaned off in order to make further use of the mirror possible. Fifth, if the bulb is kept lighted for any length of time, the heat therefrom will become so unbearable to the patient as to make the continued use of the mirror about the mouth impossible.

With the foregoing considerations in mind, the object of this invention, more specifically stated, is to overcome the disadvantages enumerated and others, through the provision of a mirror which cannot only prevent dust and débris from depositing on its surface but which can thoroughly clean cavities and surfaces of teeth from dust and débris as fast as it accumulates in excavating or grinding operations with the dental engine. This is accomplished by novel means associated with the mirror for emitting blasts of air. These blasts of air also carry off the heat generated by the electric bulb, thus keeping the mirror and its parts at all times cool and permitting the continued use of the mirror about the mouth.

The electric bulb, lying beneath the reflecting surface of the mirror cannot at any time collect dust nor in any other way prove troublesome as when exposed. The bulb lying beneath the reflecting surface of the mirror gives use to many other benefits such as sending direct rays of light to surfaces about the mouth and which rays of light are intensified by reflection from the surfaces to the mirror and back. The bulb lying beneath the reflecting surface also makes possible emitting of a concentrated beam of light through an opening in the reflecting surface and thus lighting up a particular spot or point with the greatest possible intensity. This is done in the following manner—The operator places a cap to shut off the electric light emitting parts in the mirror framework and unsilvered mirror portion and confines himself to the use of the powerful beam of light emitted through the openings in the mirror itself to the same advantage as a searchlight is used or to the way a trolley car motorman uses his headlight. This concentrated beam of light receives a great intensity in this way. The light originating from a many-candle power bulb passes through a small orifice and in passing then becomes greatly intensified by the mirror surface surrounding the said orifice.

The mirror of my invention has a handle that is unobstructed, is not awkward and is well adapted to perform all of the functions of an ordinary mouth mirror, such as retracting cheeks and lips and so forth.

By causing the air to be sucked out of the mirror simply by reversing the device pumping air into the mirror, foul breaths can be prevented from reaching the operator while the mirror is held within the mouth.

The accompanying drawings illustrate one practical embodiment of the invention, but the construction therein shown is to be understood as illustrative, only, and not as defining the limits of the invention.

Figure 1 shows a device embodying this invention with the parts shown in side elevation.

Figure 2 is a central section of the device.

Figure 3 shows a top view of the device.

Referring to the drawings, 1 designates a mirror which, in accordance with this invention, is preferably partly silvered as designated by S. It is, in its preferred form unsilvered at its periphery with part of its unsilvered portion UU supported by frameworks 2 and 4, the former of which is in the form of a hollow jacketed casing, the interior of which jacket forms a chamber T. The mirror has an opening therethrough designated O. Between the frameworks 2 and 4 is an open space serving as a conduit for conveying air. The framework 2 has on its horizontal portion P, openings for emitting or sucking in the air. These openings are designated by the numerals 3. The frameworks 2 and 4 have openings designated by numbers 5 and 5'. The framework 4 has at its very bottom an open threaded flange 6 into which an electric bulb E is adapted to be supported. The bulb E radiates its light through the opening O in the mirror 1. From the horizontal portion P of the framework 2 are horizontally extending finger pieces F for holding the mirror 1 firmly in position.

On the interior of the framework 2 is a post N forming an electric terminal with which the center contact bulb E is adapted to engage. The numerals 7 and 8 designate electric feed wires, one of which is electrically connected with the post N and the other of which is grounded on the device. These wires extend through the handle 12 to the plus and minus posts 9 and 10 of a battery 11 which supplies the current for the electric light bulb E.

The hollow handle 12 has a tubular branch 13. By means of a hose leading to 13 and connected to an air pumping device, air is pumped through the hollow handle 12 into chamber T and then to the exterior through the openings 3, 5 and O.

It will be apparent from the foregoing detailed description of the invention, in its preferred form, that it overcomes the disadvantages of prior devices. It also makes possible a clean mirror while operating even in the presence of falling dust and débris, because the ground tooth dust is blown away, a hitherto impossible thing to obtain with any mirror. My invention makes possible to use an illuminated mirror for any length of time by keeping it cool by blasts of air circulated about the bulb in the manner described. Not only is the bulb cooled by the blasts of air but surfaces upon the teeth undergoing grinding are cooled by the same blasts of air escaping through the orifices 3 and O. The opening or orifice O in the mirror is of especial importance since it allows the operator to direct a blast of air upon the exact spot to be operated upon. This blast will not only blow away dust, etc., but will serve to keep the tooth cool. The mere manipulation of the reflector into a position to allow the operator to see said tooth will bring about accurate direction of the blast. In the same way a powerful beam of light can be directed to the area to be operated upon and this is one of the most important features of all.

Having thus fully described the invention, what I claim as new and desire to secure by Letters Patent is:

1. In a device of the character described, a hollow casing, means for introducing fluid into the casing, a mirror supported by the casing and provided with an aperture through which the fluid introduced into the casing may escape in the form of a blast, and illuminating means positioned within the casing.

2. In a device of the character described, a hollow casing, means for introducing fluid into the casing, a mirror supported by the casing and provided with an aperture through which the fluid introduced into the casing may escape in the form of a blast, said casing being also provided with at least one fluid outlet forwardly of the mirror, whereby fluid within the casing may escape therefrom and form a blast over the exterior face of the mirror to blow off dust and mirror clouding matter.

3. In a device of the character described, a hollow casing provided with an open side, a mirror closing the open side, a conduit through which fluid may be introduced into the casing, and said casing being provided with at least one opening adjacent the outer face of the mirror to permit of the escape of the fluid from the interior of the mirror and to direct such fluid over the outer surface of the mirror to keep said surface clear of dust and mirror clouding matter.

4. In a device of the character described, a hollow casing provided with an open side, a mirror closing the open side, a conduit through which fluid may be introduced into the casing, and said casing being provided with at least one opening adjacent the outer face of the mirror to permit of the escape of the fluid from the interior of the mirror and to direct such fluid over the outer surface of the mirror to keep said surface clear of dust and mirror clouding matter and a source of illumination within the casing.

5. In a device of the character described, a hollow casing having an open side, a mirror closing said open side, a lamp positioned within the casing back of the mirror, and means for circulating a gaseous cooling medium about the lamp and back of the mirror.

6. In a device of the character described, a hollow casing having an open side, a mirror closing said open side, a lamp positioned within the casing back of the mirror, and means for circulating air about the lamp and back of the mirror to preclude undue heating of the parts.

7. In a device of the character described, a hollow casing having an open side, a mirror closing said opening side, a lamp positioned within a casing back of the mirror, and means for circulating air about the lamp to preclude undue heating of the parts, said mirror being provided with an opening through which the air circulated about the lamp is adapted to escape in the form of a blast.

8. In a dental device of the character described, a casing having an open side, a mirror closing said open side and provided with a perforation to permit the passage of a beam of light therethrough, and a source of light within the casing.

9. A dental mirror embodying a reflecting surface and provided with an air passage terminating in a plurality of air outlets positioned adjacent the reflecting surface, whereby a blast of air may flow from said opening across said surface to blow dust therefrom.

10. A dental device embodying a mirror with a reflecting surface, and means comprising a conduit having a plurality of air outlets adjacent the reflecting surface of the mirror to direct a blast of air across said surface to keep said surface free from deposits of dust and other extraneous matter.

11. A dental mirror provided rearwardly of the reflecting surface with a source of illumination, and means for pneumatically cooling the parts of the mirror to preclude overheating thereof by the source of illumination.

12. A dental device embodying a dental mirror provided with a perforation therein through which fluid may pass, and a handle for the mirror which handle is hollow and forms a conduit through which fluid is fed to said perforation.

13. A dental mirror embodying a hollow casing having an open side, a perforated mirror extending across the open side, a lamp positioned within the casing, and means for circulating a cooling medium about the lamp.

14. A dental mirror having a reflecting surface and which mirror is provided with a perforation extending therethrough, and a walled passage associated with the mirror to feed under pressure to the perforation whereby said fluid is adapted to issue from the perforation through the face of the mirror in the form of a blast which may be directed in any desired direction.

15. A dental mirror embodying a hollow casing having an open side, a perforated mirror forming a closure for said open side and a source of illumination within the casing.

In testimony whereof, I have signed the foregoing specification.

IRVING KULIK.